United States Patent
Zunzer et al.

(10) Patent No.: US 9,950,599 B2
(45) Date of Patent: Apr. 24, 2018

(54) SEALING FOR A VEHICLE ROOF

(71) Applicant: Webasto SE, Stockdorf (DE)

(72) Inventors: Andreas Josef Zunzer, München (DE); Gerhard Skorianz, Maisach (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 15/311,767

(22) PCT Filed: Jun. 4, 2014

(86) PCT No.: PCT/EP2014/061542
§ 371 (c)(1),
(2) Date: Nov. 16, 2016

(87) PCT Pub. No.: WO2015/185122
PCT Pub. Date: Dec. 10, 2015

(65) Prior Publication Data
US 2017/0087970 A1    Mar. 30, 2017

(51) Int. Cl.
*B60J 10/12* (2006.01)
*B60J 10/82* (2016.01)
*B60J 10/20* (2016.01)
*B60J 10/24* (2016.01)
*B60J 10/30* (2016.01)

(52) U.S. Cl.
CPC ............... *B60J 10/82* (2016.02); *B60J 10/20* (2016.02); *B60J 10/24* (2016.02); *B60J 10/30* (2016.02)

(58) Field of Classification Search
CPC ... B60J 10/82; B60J 10/84; B60J 10/20; B60J 10/24; B60J 10/30
USPC .................... 296/216.01–224; 49/489.1
See application file for complete search history.

(56) References Cited

U.S. PATENT DOCUMENTS

| | | | |
|---|---|---|---|
| 2006/0230686 A1* | 10/2006 | Plum | B60J 5/0405 49/498.1 |
| 2008/0217964 A1 | 9/2008 | Katayama et al. | |
| 2009/0085382 A1 | 4/2009 | Bergmiller et al. | |
| 2012/0261953 A1* | 10/2012 | Dryselius | B60J 7/022 296/216.06 |

FOREIGN PATENT DOCUMENTS

| | | |
|---|---|---|
| DE | 196 13 761 C1 | 7/1997 |
| DE | 200 06 572 U1 | 10/2000 |
| DE | 200 06 330 U1 | 5/2001 |
| EP | 1 026 022 A2 | 8/2000 |
| EP | 2 042 361 A2 | 4/2009 |

OTHER PUBLICATIONS

International Search Report for PCT/EP2014-061542 dated Feb. 2, 2015 (4 Pages).

* cited by examiner

*Primary Examiner* — Dennis H Pedder
(74) *Attorney, Agent, or Firm* — Fitch, Even, Tabin & Flannery, LLP

(57) ABSTRACT

A roof module for a vehicle roof, which can have a roof panel for closing an opening in the vehicle roof, a frame for mounting the Roof module onto the vehicle roof, a sealing which can be fixedly mounted to the frame for sealing engagement with the panel, and adjusting elements for adjusting the roof panel relative to the frame. The sealing can have a cover lip for covering the adjusting elements, wherein the cover lip can be bent away in a resilient manner for accessing the adjusting elements.

18 Claims, 5 Drawing Sheets

SEALING FOR A VEHICLE ROOF

CROSS-REFERENCE TO RELATED APPLICATIONS

This application is a U.S. national phase application filed under 35 U.S.C. § 371 of International Application No. PCT/EP2014/061542, filed Jun. 4, 2014, designating the United States, which is hereby incorporated herein by reference in its entirety for all purposes.

FIELD

The present invention relates to a roof module for a vehicle and a sealing for sealing engagement with a roof panel of a vehicle.

Specifically, a roof module for a vehicle can have a roof panel for closing an opening. Such a roof module can constitute the complete roof of a vehicle or it can be mounted onto the roof of a vehicle. In the first instance, the opening is a roof opening within the roof module itself. In the second case, the roof comprises the opening and the roof module provides for the panel for closing the opening. The opening can be closed permanently by the panel or the panel can be movable in order to selectively open and close the opening.

A frame can be used for mounting the roof module onto the vehicle roof. The frame can have a rectangular shape or can be u-shaped thus being parallel to three or four side edges of the opening. A sealing is fixedly mounted to the frame for sealing engagement with the panel. Such a sealing can be a sealing which serves to prevent the entrance of water into the vehicle or it can also be an acoustic sealing provided for preventing noise to enter the interior room of the vehicle. In any case such a roof panel needs to be adjusted relative to the frame and hence relative to the vehicle roof.

BACKGROUND

The disadvantage of known vehicle roof modules is the problem, that such an adjustment cannot be done in a mounted and closed position of a roof panel, which would be the optimum procedure, since only in closed and mounted position of the roof panel a precise adjustment leads to a homogeneous engagement between the whole sealing and the roof panel. On the other hand, it is a common request that any screw heads of according adjustment screws have to be invisible and hence covered when the roof panel is closed. Covered screw heads, however, imply the problem, that for a fine adjustment, the respective sealing has to be unmounted or demounted or has to be defined by a hollow seal section which is high enough to be pushed away by a screwdriver for accessing the screws. A further alternative would be to open or remove the roof module followed by a trial-and-error procedure regarding the adjustment. A large hollow seal section in turn has the disadvantage that more space for the sealing is needed which is critical. In addition, it is critical to guide such high profile hollow seal sections around a radius without generating a kink or crinkles. The risk that such a large hollow seal section is damaged or punctured by a screwdriver is also rather high.

SUMMARY

It is an object of the present invention to provide a roof module and a corresponding sealing which overcome these problems.

These problems are solved by a roof module according to claim 1 and the sealing according to claim 13.

According to the present invention the inventive sealing comprises a cover lip for covering the adjusting elements, wherein the cover lip can be bent away in a resilient manner for accessing the adjusting elements.

Such an inventive roof module with a respective sealing has the advantage that adjusting elements can be accessed with a mounted and closed roof panel. Hence, there is no need to remove any sealing for accessing the adjusting elements and the whole roof module can be fine adjusted in a completely mounted and closed state.

Preferred embodiments of the present invention are defined in the dependent claims.

Preferably, the adjusting elements comprise adjusting screws.

A preferred embodiment of the sealing comprises a sealing foot extending in a direction towards the vehicle interior and adapted to be inserted into a corresponding notch of the frame for mounting the sealing to the frame.

Preferably, the sealing foot comprises a plurality of lips which are oriented in a horizontal or in a backward direction pointing away from the notch thus providing additional holding force for the sealing foot within the notch.

The sealing can comprise a horizontal foot plate and the foot plate and the sealing foot preferably define a T-shaped cross section.

The sealing preferably comprises a hollow seal section extending from the foot plate on the side opposite to the sealing foot and adapted for a sealing engagement with the roof panel. The hollow seal section, the foot plate and the sealing foot can define a cross section in a plane perpendicular to the longitudinal axis of the sealing, the cross section having mirror symmetry with a vertical center line (A) going through the sealing foot.

In a further preferred embodiment, the cover lip extends from the foot plate downwards in a vertical direction. Alternatively, the cover lip has a V-shaped cross section with a horizontal first section extending from the foot plate and an end section extending downwards from the end of the first section in a direction back towards the sealing foot.

The adjusting screws are preferably oriented in a horizontal direction and are crossing the sealing through cut-outs or openings in the sealing foot.

The seal lip can be cut away in regions where the sealing is bent along a corner of the roof opening. This reduces the formation of wrinkles.

BRIEF DESCRIPTIONS OF THE DRAWINGS

Embodiments of the present invention will be explained in further detail by reference to the drawings in which FIG. 1 is a schematic perspective view of a roof module in accordance with the present invention;

DETAILED DESCRIPTION

Figure 1:
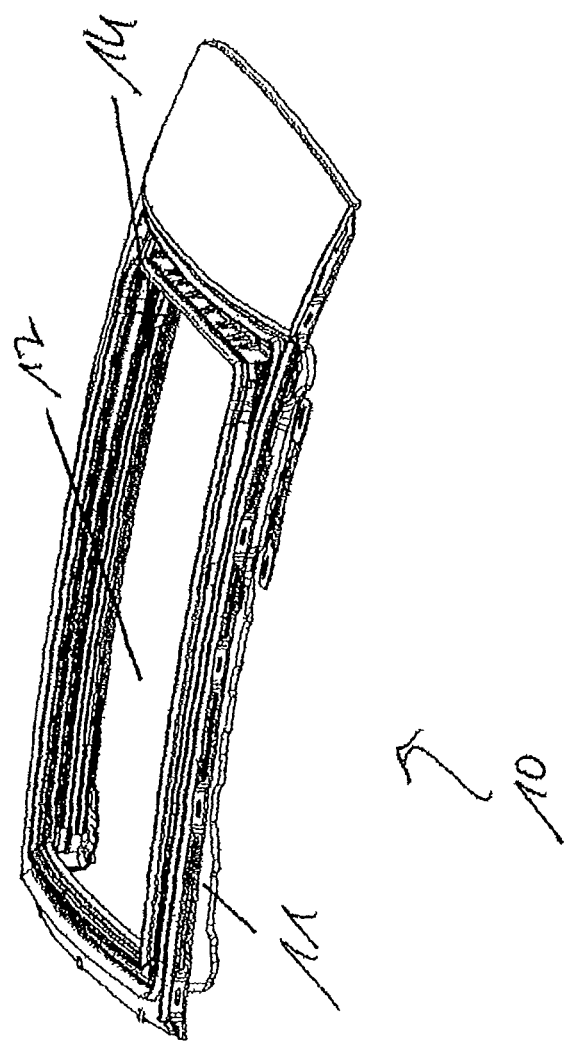

FIG. 1 shows a roof module 10 for a vehicle roof according to the present invention. Such a roof module can be used to define the whole roof of the vehicle or can be placed onto an opening in a vehicle roof. Hence, such a roof module 10 as shown in FIG. 1 can itself define an opening 12 since it defines a complete vehicle roof, or it can be used to cover only a specific part of a vehicle roof where this part comprises a respective opening.

Not shown in FIG. 1 is a roof panel which can close the opening 12 in a fixedly manner. As an alternative, such a roof panel can be used to open and close the opening 12 selectively by moving the roof panel by means of a sliding mechanism into the opening 12 and on the other hand by removing it again such that the opening 12 is cleared. The roof module 10 of FIG. 1 comprises a frame 11 for mounting a roof module onto the vehicle. Attached to the frame 11 is a sealing 14 which is fixedly mounted to the frame 11 for sealing engagement with the not shown panel. The frame 11 comprises adjusting elements (not shown) for adjusting the roof panel relative to the frame or relative to the sliding mechanism and hence relative to the vehicle itself and/or for adjusting the frame or the sliding mechanism relative to the vehicle.

Figure 2:
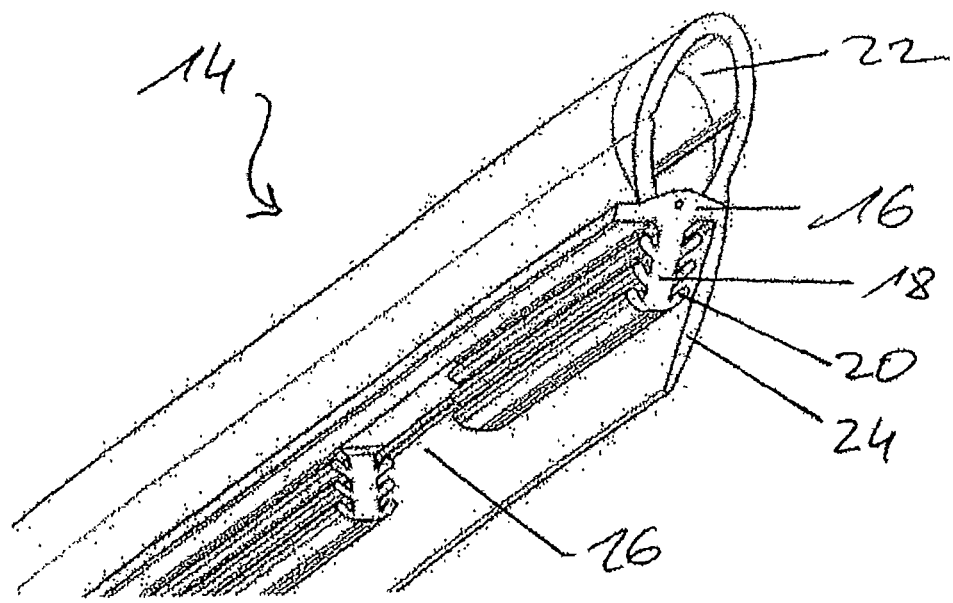
FIG. 2 is a schematic perspective view of a sealing according to the present invention.
Figure 7:
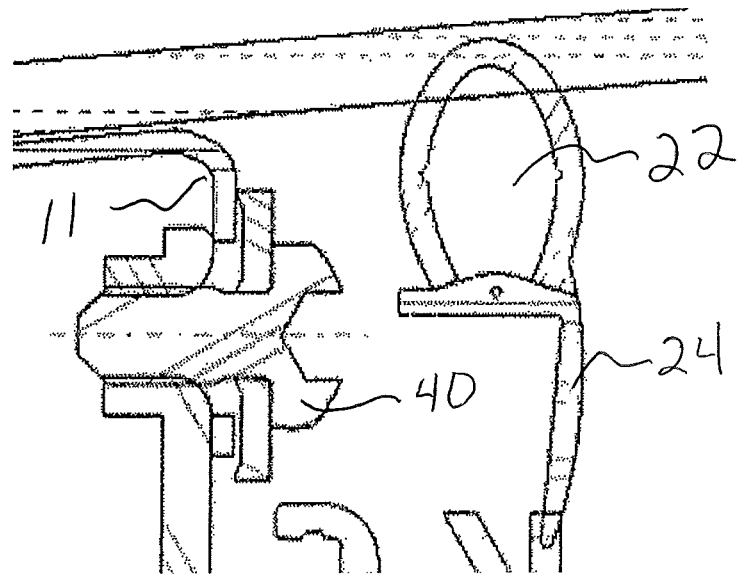
FIG. 7 is a cross-section of a sealing according to FIGS. 2-4, in situ, showing an adjusting element horizontal screw.
Figure 8:
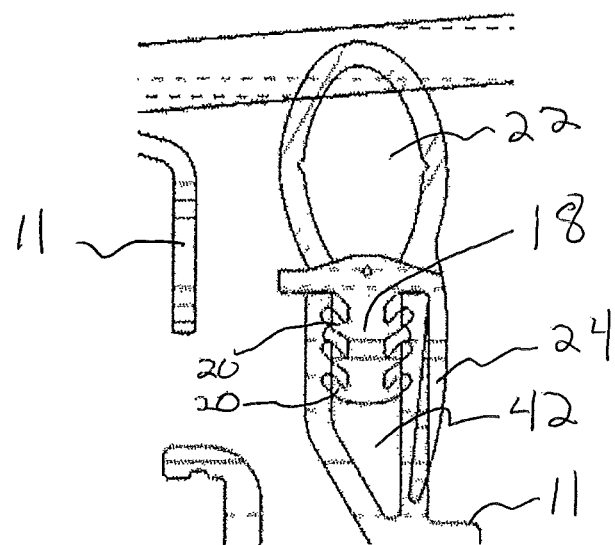
FIG. 8 is a cross-section of a sealing according to FIGS. 2-4, in situ, showing a notch.

FIG. 2 shows a sealing 14 according to the present invention in more detail. The perspective view onto the sealing 14 shows that the sealing is defined by a sealing foot plate 16, a sealing foot 18, a cover lip 20 and a hollow seal section 22. Foot plate 16 and sealing foot 18 are defining a T-shaped cross-section. The complete sealing 18 can be mounted onto a surface (of the frame 11) by means of a notch 42 (FIG. 8) into which the sealing foot 18 is plugged. Sealing foot 18 defines additional lips 20 such that the engagement between the sealing foot 18 and the corresponding notch is improved. On one side of the foot plate 16 a cover lip 14 is formed by the sealing 14. Cover lip 24 extends parallel to the sealing foot 18 from an end of the foot plate 16 which is oriented towards the opening 12 of the roof module 10 of FIG. 1. Hence, the cover lip 24 extends along a vertical direction towards the interior room of the vehicle and is oriented on the side of the sealing foot 18 which is adjacent to the opening 12, thereby covering the heads of the adjusting screws 40 (FIG. 7). Above the foot plate 16, sealing 14 defines a hollow seal section 22 which provides for the sealing engagement with the roof panel which is pressed from above onto the hollow seal section 22.

Sealing 14 of FIG. 2 is injection molded or extruded in one piece. It can be used for sealing anyone of the four sides of the opening 12 of roof module 10 as shown in FIG. 1. Preferably, it is used to seal the front edge of the opening 12 and the two side edges. That means that preferably one single sealing 14 is used and bent into a U-shape such that this U-shape sealing 14 is attached to three side areas of opening 12. Sealing 14 can be any kind of sealing against noise or water but preferably is an acoustic sealing.

As can be seen from FIG. 2, the sealing 14 comprises cut out regions 26 where the sealing foot 18 is locally removed (punched or stamped out). These cut out regions 26 are localized in areas of the frame 11 where adjusting screws are provided. The heads of these adjusting screws are covered by the cover lip 24. Since cover lip 24 is on the side of the sealing 14 which is oriented towards the opening 12, cover lip 24 covers the screw heads from a view from the interior room of the vehicle. On the other hand, by bending away the cover lip 24 in a resilient manner, the screw heads of the horizontal screws can be accessed for adjusting the position of the roof panel relative to the frame 11 of roof module 10 and hence relative to the vehicle itself.

Figure 3:
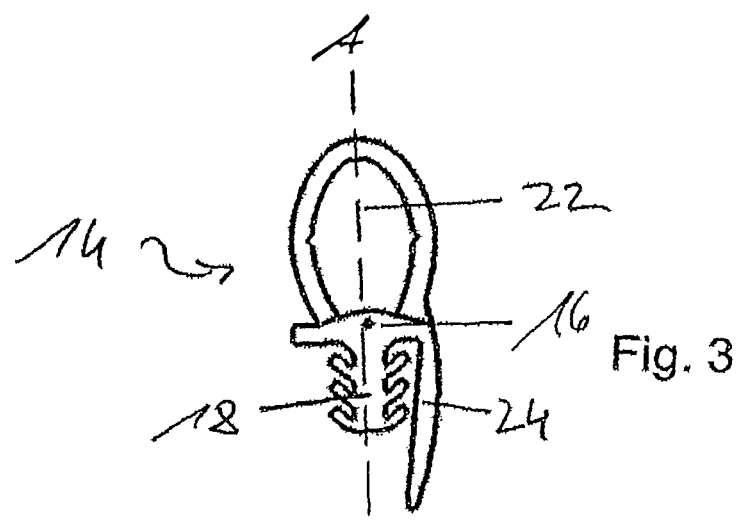
FIG. 3 is a cross-section through the sealing of FIG. 2.
Figure 4:
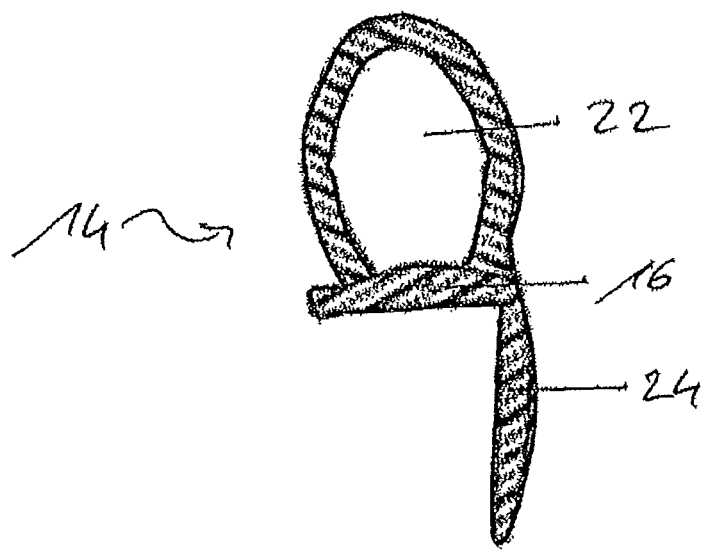
FIG. 4 is a further cross-section of the sealing of FIG. 2.

FIGS. 3 and 4 show cross-sections through the sealing of FIG. 2. FIG. 3 shows a cross-section through an area of the sealing 14 where the cover lip 24 is not removed. As can be seen from the cross-section of FIG. 3, foot plate 16, sealing foot 18 and the hollow seal section 22 of sealing 14 have a mirror symmetry regarding a symmetry line "A". In the cross-section of FIG. 3, this mirror symmetry is removed by the cover lip 24. Sealing 14 of FIG. 3 is to be mounted to a vehicle roof such that cover lip 24 is oriented towards the interior space of a vehicle (i.e. a vertical direction) and, when sealing 14 is mounted along a an edge of an opening within the vehicle roof, cover lip 24 is positioned towards the opening. Such a mounting leads to the advantage that cover lip 24 can cover any mounting and adjusting elements, like adjusting screws which are behind the cover lip 24 on the side of the cover lip 24 where sealing foot 18 is located. As can further be seen from FIG. 3 and also FIG. 2, cover lip 24 preferably is not aligned in an exact vertical orientation but is slightly tilted towards symmetry axis A. This means that cover lip 24 is tilted in a direction away from the opening of the vehicle roof which would be on the right side of FIG. 3. This has the advantage that any screw heads which are positioned near the sealing foot 18 or to be more precise in the area of the cut out region 26 of FIG. 2, are not only covered when looking on the cover lip 24 along a horizontal direction but also when looking from the position below the opening (from the lower right side of FIG. 3) in an upward direction towards cover lip 24.

FIG. 4 shows the cross-section of sealing 14 of FIG. 2 in an area of the cut out region 26. As explained already in connection with FIG. 2, sealing foot 18, which can be seen in the cross-section of FIG. 3, is removed in the cross-section of FIG. 4, so as to have enough space for positioning and/or accessing the heads of adjustment screws, where the adjustment screws would be oriented in a horizontal direction with the screw head end facing towards cover lip 24. Hence, by bending up cover lip 24 such a screw head becomes accessible for a screwdriver. As soon as the screwdriver is removed from the screw head, cover lip 24 bends back in the position as shown in FIG. 4 in a resilient manner. It is hence very easy to access any adjusting elements which are located behind the cover lip 24 also when an according roof module is completely mounted and when the roof panel closes a respective opening in a vehicle roof. On the other hand, these adjusting elements are again covered and are not visible from the inside of the vehicle as soon as the screw driver (or an equivalent tool) is removed.

Figure 5:
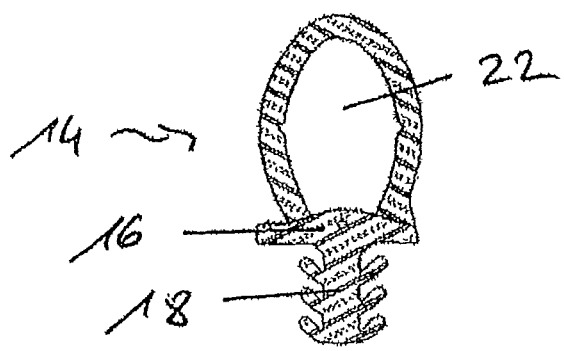
FIG. 5 is a cross-section of a sealing according to FIGS. 2-4 where a cover lip is partially removed.

FIG. 5 shows a further cross-section through a sealing 14 according to FIG. 2. As can be seen from this cross-section in this area of the sealing 14 the cover lip 24 itself is removed, e.g. stemmed away or cut-off. Such a partial removal of the cover lip 24 has benefits in case the whole sealing has to be bent around a corner (e.g. one of the four corners of the rectangular opening 12 in the vehicle roof for FIG. 1). When bending a sealing 14 according to FIG. 2 around such a corner, cover lip 24 can tend to build up crinkles or wrinkles. This can be avoided by locally removing cover lip 24.

Figure 6:
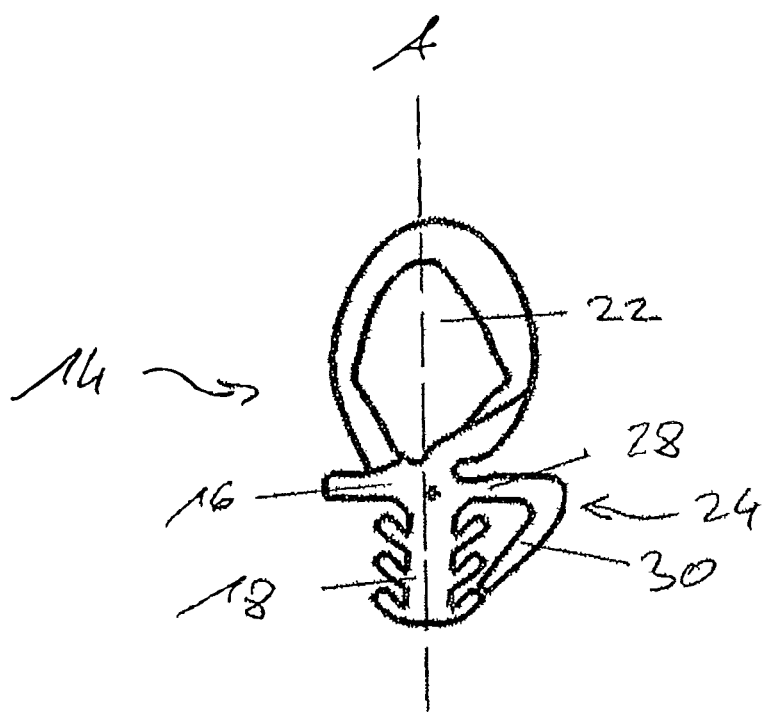
FIG. 6 is a cross-section through an alternative inventive embodiment of a sealing in accordance to the present invention.

A sealing 14 having a different cross-section is shown in FIG. 6. In this embodiment, foot plate 16, sealing foot 18 and hollow seal section 22 are very similar to the embodiment of FIGS. 2 to 5 (although hollow seal section 22 is not completely symmetrical with respect to symmetry line A). The main difference, however, is related to cover lip 24 which in this embodiment comprises a first section 24 which is a horizontal elongation of the horizontal foot plate 16, and an end section 30, which goes down and backwards towards sealing foot 18. This results in a V-shaped cover lip 24 which leads to better bending results when bending the sealing 14 into a curve with a center line A which goes in a vertical direction through sealing foot 18. In comparison to a cover lip 24, which is rather linear sloped, as can be seen in FIGS. 2 to 5, the V-shaped cover lip 24 of FIG. 6 builds up less wrinkles during such a bending operation.

The invention claimed is:

1. Roof module for a vehicle, comprising:
a roof panel for closing an opening in the roof module,
a frame for mounting the roof module onto the vehicle,
a sealing which is fixedly mounted to the frame for sealing engagement with the panel, and
adjusting elements for adjusting the roof panel relative to the frame;
wherein
the sealing further comprises a cover lip for covering the adjusting elements, wherein the cover lip can be bent away in a resilient manner for accessing the adjusting elements with an adjusting tool.

2. Roof module according to claim 1, wherein the adjusting elements comprise adjusting screws.

3. Roof module according to claim 2, wherein the sealing comprises a sealing foot extending in a direction towards the vehicle interior and adapted to be inserted into a corresponding notch of the frame for mounting the sealing to the frame.

4. Roof module according to claim 3, wherein the sealing foot comprises a plurality of lips, which are oriented in a horizontal or in a backward direction pointing away from the notch, whereby additional holding force for the sealing foot within the notch is provided.

5. Roof module according to claim 4, wherein the sealing comprises a horizontal foot plate.

6. Roof module according to claim 5, wherein foot plate and the sealing foot define a T-shaped cross section.

7. Roof module according to claim 6, wherein the sealing comprises a hollow seal section extending from the foot plate on the side opposite to the sealing foot and adapted for a sealing engagement with the roof panel.

8. Roof module according to claim 7, wherein the hollow seal section, the foot plate and the sealing foot define a cross section in a plane perpendicular to the longitudinal axis of the sealing, the cross section having a mirror symmetry with a vertical center line (A) going through the sealing foot.

9. Roof module according to claim 5, wherein the cover lip is extending from the foot plate downwards in a vertical direction.

10. Roof module according to claim 3, wherein the cover lip has a V-shaped cross section with a horizontal first section extending from the foot plate and an end section extending downwards from the end of the first section in a direction back towards the sealing foot.

11. Roof module according to claim 3, wherein the adjusting screws are oriented in a horizontal direction and are crossing the sealing through cut-outs or openings in the sealing foot.

12. Roof module according to claim 3, wherein the sealing is cut away in regions where the sealing is bent along a corner of the roof opening.

13. Sealing for sealing engagement with a roof panel of a vehicle, the sealing comprising a sealing foot for mounting the sealing, and a horizontal foot plate, wherein the foot plate and the sealing foot define a T-shaped cross section, the sealing further comprising a hollow seal section extending from the foot plate on the side opposite to the sealing foot, wherein
the sealing further comprises a cover lip for covering adjusting screws for adjusting the roof panel relative to the vehicle.

14. Sealing according to claim 13, wherein the cover lip extends from a side area of the foot plate in a direction parallel to the sealing foot.

15. Sealing according to claim 13, wherein the cover lip has a V-shaped cross section with a first section extending parallel to and from the foot plate and an end section extending from the first section downwards and in a direction towards the sealing foot.

16. Sealing according to claim 13, wherein the sealing comprises cut-outs or openings in the sealing foot for receiving the adjusting screws.

17. Sealing according to claim 13, wherein the sealing foot is cut away in regions where the sealing is to be bent along a corner of the roof opening.

18. The sealing according to claim 13, wherein the sealing foot is configured for mounting the sealing into a corresponding notch.

* * * * *